United States Patent [19]

Steadman

[11] Patent Number: 4,960,299
[45] Date of Patent: Oct. 2, 1990

[54] MOBILE ACCOMMODATION STRUCTURE WITH EXTENSION UNIT

[76] Inventor: William D. Steadman, 2 Pond Walk Hayle, Cornwall, England

[21] Appl. No.: 376,367

[22] Filed: Jul. 6, 1989

[30] Foreign Application Priority Data

Jul. 6, 1988 [GB] United Kingdom ............... 8816140

[51] Int. Cl.⁵ ............................................. B60P 3/32
[52] U.S. Cl. ................................. 296/26; 296/172; 296/176
[58] Field of Search ............... 296/26, 165, 169, 172, 296/174, 176; 52/79.5

[56] References Cited

U.S. PATENT DOCUMENTS

| | | | |
|---|---|---|---|
| 2,132,409 | 10/1938 | Gedeon | 296/172 |
| 2,484,312 | 10/1949 | Rebours | 296/172 |
| 2,831,722 | 4/1958 | Hanson et al. | 296/172 |
| 3,070,850 | 1/1963 | McClure, Sr. | 296/172 |
| 3,271,065 | 9/1966 | Scuris | 296/192 |
| 4,114,942 | 9/1978 | Greiner | 296/172 |
| 4,856,843 | 8/1989 | Elliott | 296/26 |

Primary Examiner—Robert R. Song
Attorney, Agent, or Firm—Needle & Rosenberg

[57] ABSTRACT

A mobile accommodation structure such as a caravan or motor home is provided with at least one foldable extension (21, 22, 23) which can be erected from at least one side wall (12) to enlarge the interior volume enclosed by the mobile structure; the extension is in the form of an erectable wall structure including a first wall panel (21) pivotally and slidably connected to the said one wall (12) of the mobile accommodation structure for movement between an erected position in which it lies at an angle to the said one wall (12) and a storage position in which it lies generally parallel to the said one wall (12) and displaced parallel thereto with respect to its erected position, a roof panel member (33) movable between erected and storage positions in the former of which it overlies the said wall structures (21, 22, 23) in its erected position, and a movable floor panel (31) displaceable between erected and storage positions, in the former of which it lies parallel to and coplanar with the floor (34) of the mobile accommodation structure within the volume defined by the erected wall structure.

14 Claims, 4 Drawing Sheets

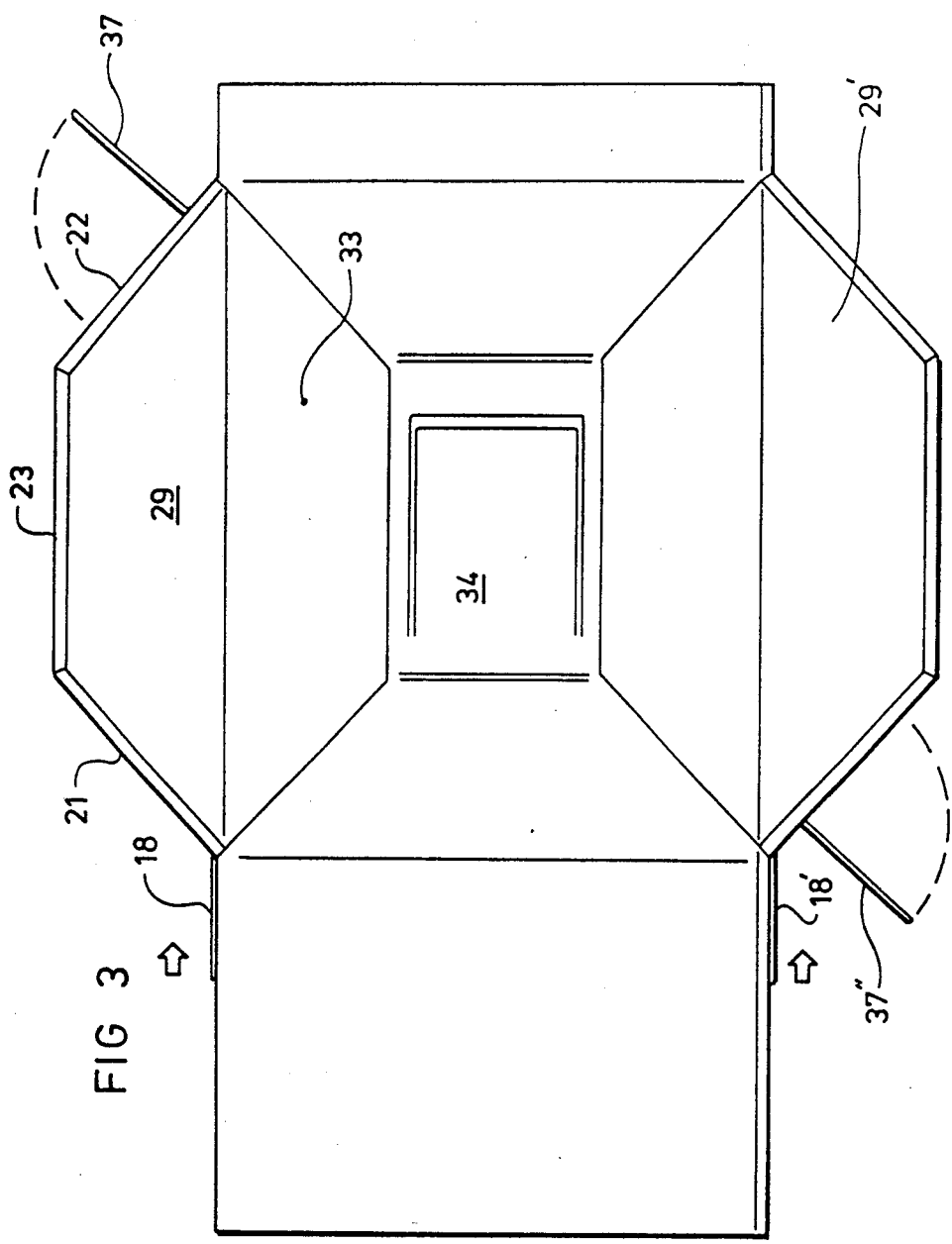

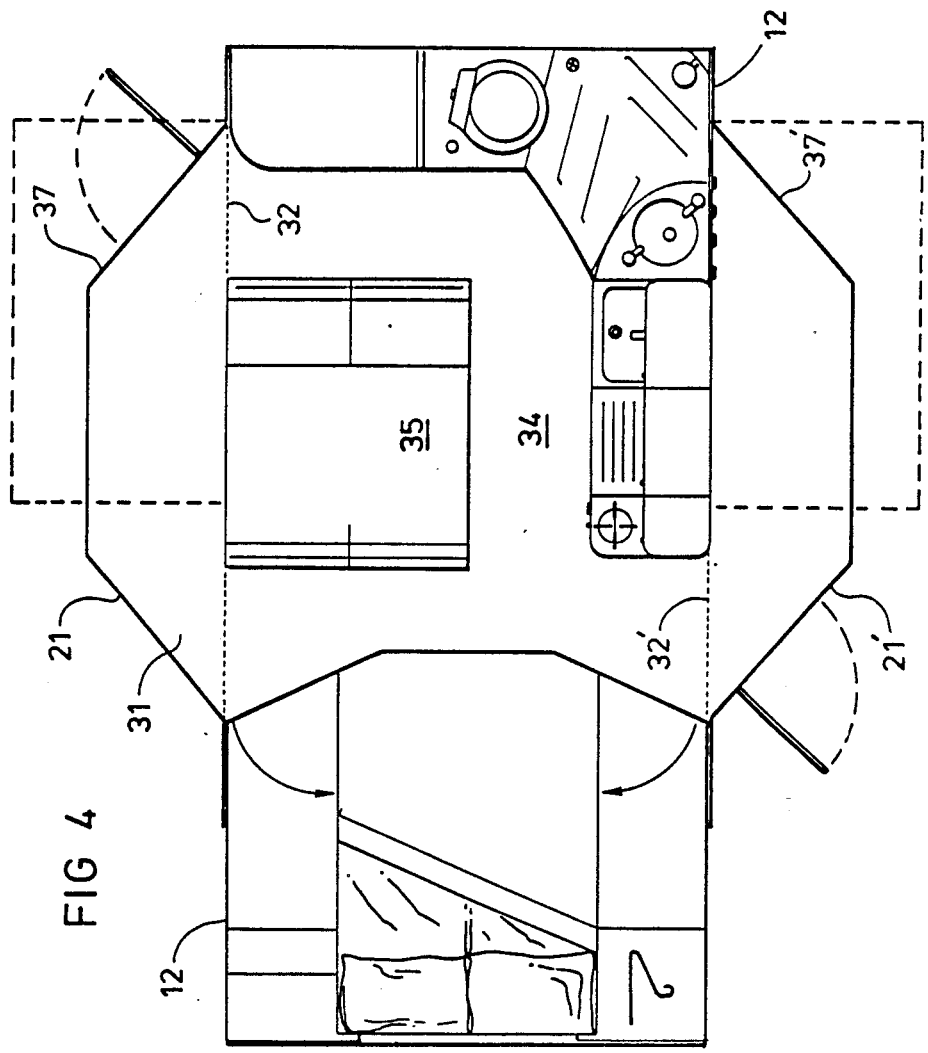

MOBILE ACCOMMODATION STRUCTURE WITH EXTENSION UNIT

BACKGROUND OF THE INVENTION

The present invention relates generally to a mobile accommodation structure and particularly to such a structure provided with an extension unit by which it is possible to extend the available volume within the structure, and to an extension unit for use on a mobile accommodation structure.

The term "mobile accommodation structure" will be understood herein to refer to any rigid or semi-rigid structure usable as accommodation for personnel, whether for domestic, industrial or business purposes. The present invention will be described hereinafter with particular reference to its application to towable caravans, but this description is presented without prejudice to the generality of the invention which can be applied to mobile accommodation structures whether provided with wheels or not, and which are adapted to be moved in one way or another from one place to another In particular, it is intended that the present invention be applicable not only to caravans, but also to portable buildings adapted to be lifted onto and transported by transporter lorries, and also to such lorries and vans themselves, which are often provided with a body intended to be used for accommodation of goods and personnel, particularly when stationary. This is especially the case with vans used by roundsmen or mobile salesmen, where it is advantageous to be able to enlarge the space within the vehicle whilst stationary and available for sales, but to reduce the size of the vehicle for transport from place to place. The same principle of operation can be applied to railway vehicles to enlarge the accommodation space when stationary and reduce it when travelling.

The convenience of a reduction in size of a towable vehicle such as a caravan is well known and a number of attempts to provide caravans and like such mobile accommodation structures with expansion units have been made. Perhaps the most widely successful is the structure described in published European Patent application No. 006072 which includes wall and roof panels which can be folded down into a very small volume for towing purposes, and enlarged, when stationary by erection of the folded wall panels from a position within the trailer to an erected position where they define a relatively large volume. Other structures having this general configuration are known, and the major disadvantage of these, apart from the relatively long time taken to convert from the collapsed to the erected position (and European Patent application 006072 is particularly concerned with an improvement of such a structure whereby it can be erected and collapsed entirely automatically using hydraulic or pneumatic means) lies in the fact that, when collapsed to form a trailer, the walls and roof of the structure occupy the majority of the internal space of the trailer so that relatively little space is left for furnishings and/or clothing which may be wanted.

Various other proposals have been made for enlarging the usable volume of a caravan, particularly by the use of tent-like awnings and/or folding panels which lie alongside the side wall of the caravan when collapsed. Once such structure is described in British Patent application No 2,174,732A which discloses a structure such as a portable building or the body of a vehicle or trailer defining an internal space which is rectangular in plan. Each of a pair of opposite side walls of the structure has an aperture closable by hinged flaps which are openable to form the base, top and walls of an extension enlarging the normal internal space of the structure. The outward extensions, when erected, form an enlarged central region extending laterally from the normal internal space of the structure, and this may be partitioned by inclined partitions to form the main compartment of the portable building when erected.

A primary disadvantage of the structure disclosed in the above Patent lies in the fact that the two side wall panels, when folded to the collapsed position, overlie one another so that it is in practice not possible to fit either side wall with a door or window usable in both the erected and collapsed positions. The user then does not have any choice as to whether to erect the extension or to use the structure in the collapsed state but is forced always to extend the structure into its erected condition in order to make it usable.

OBJECTS OF THE INVENTION

A primary object of the present invention is to provide an expandable mobile accommodation structure.

A secondary but nevertheless still important aspect of the invention is to provide a mobile accommodation structure in which it is possible to fit at least some of the panels of an extension structure, which can be moved between a collapsed and an extended position, with either windows or doors.

A further object of the invention is to fit an extension structure with a door or window usable both in the collapsed as well as the extended position of the extension structure.

A further object of the invention is to provide an extension structure which does not seriously impinge on the interior volume of the mobile accommodation structure when in its collapsed state so that the user is entirely free to determine whether or not to extend the structure at any one time, therefore allowing short stay stops to be made with the structure collapsed without any disadvantage.

Another object of the invention is to provide an extendable mobile accommodation structure in which erection of the extension can be achieved rapidly and easily whenever additional interior space is required.

SUMMARY OF THE INVENTION

According to one aspect of the present invention, therefore, a mobile accommodation structure is provided with at least one integral foldable extension which can be erected from at least one side wall to enlarge the interior volume enclosed by the mobile structure, comprising a first hinged floor extension member turnable about a pivot axis thereof between an erected position generally parallel to and co-planar with the floor of the mobile accommodation structure and a folded position, an erectable wall structure, and a hinged roof panel member turnable between a use position extending over the said erectable wall structure and an out-of-use position, in which the erectable wall structure includes a wall panel pivotally and slidably connected to the said one wall of the mobile accommodation structure for movement between an erected position in which it lies at an angle to the said one wall and a non-erected position in which it lies generally parallel to the said one wall and displaced parallel thereto with respect to its erected position.

The concept of utilising an extension wall panel which is both turnable and slidable with respect to the wall of the structure which it extends makes it possible for collapsing and erection movements to be made very quickly and easily because the necessary motion of said first wall panel is constrained by appropriate guides of the said one wall.

In one embodiment of the invention the erectable wall structure incorporates a second wall panel Which is pivotally connected on a fixed axis to the said one wall. The second wall panel may be pivotally connected at its free edge (that is the edge not pivotally connected to the said one wall) directly to the first wall panel member or, alternatively, and preferably, may be pivotally connected to a third wall panel which is itself pivotally connected by opposite edge to adjacent edges of the said first and second wall panels. The second and (if provided) third wall panels, both in the erected and collapsed positions of the erectable wall structure, are not obstructed by other members of the erectable wall structure and, consequently, may have windows and/or doors therein, which can be used equally readily whether the erectable wall structure is in its collapsed or its extended condition. The first wall panel may additionally be provided with windows and, even, a door, but since this wall panel member is displaceable with respect to the said one wall of the mobile accommodation structure it must, necessarily, overlie a part of the said one wall when the erectable wall structure is collapsed, and consequently any window and/or door in the said first wall panel cannot be used with the erectable wall structure in the collapsed condition.

The first wall panel preferably has a constrained pivot edge slidable along tracks on the said one side wall of the mobile accommodation structure such that displacement motion from the erected to the collapsed state can be achieved simply by turning the said second wall panel about its pivotal connection with the said one wall. Additionally displacing the third wall panel, if provided, between its collapsed and erected positions.

In a preferred embodiment of the invention the roof panel is turnable about an axis along a line parallel to the said one side wall between its use position over the walls of the erectable wall structure and an out-of-use position generally parallel to and overlying the roof of the mobile accommodation structure.

Likewise, the floor panel of the extension is preferably turnable about an axis parallel to the said one side wall between a co-planar use position and an out-of-use position in which it lies generally parallel to the said one side wall (in this position also lying generally perpendicular to the floor of the mobile accommodation structure).

The present invention also comprehends an extension structure for a mobile accommodation unit, comprising slide rails for a first extension wall, a slidable pivot for connecting the first extension wall to the said slide rails, and at least a second extension wall pivotally connectable to a wall of the mobile accommodation unit. Such an extension structure may be made and sold as a separate unit for adaptation of existing accommodation units such as caravans which, of course, would require to have an opening formed in the side wall to which the extension structure was intended to be fitted. Such an opening may, of course, be appropriately reinforced around its edges although the slide rails themselves would also constitute additional reinforcement of the side wall.

In an extension structure formed according to this second aspect of the invention the second extension wall may be pivoted both to the said one side wall and to the said first extension wall or, as in the first aspect of the invention discussed above, there may be provided a third extension wall pivotally connected between the first and second. In either case, appropriately hinged floor and roof panel members are also provided, together with means for attaching these to a mobile accommodation unit in the vicinity of the upper and lower edges of the opening to be closed by the wall panel members of the extension structure.

Various other features and advantages of the invention will become more apparent from a study of the following description, in which reference is made to the accompanying drawings, provided purely by way of non-limitative example only.

BRIEF DESCRIPTION OF THE DRAWINGS

FIG. 3 is a plan view from above of the caravan illustrated in FIG. 2; and

FIG. 4 is a plan view similar to that of FIG. 3, showing the internal arrangement of the caravan.

DESCRIPTION OF THE PREFERRED EMBODIMENTS

Figure 1:
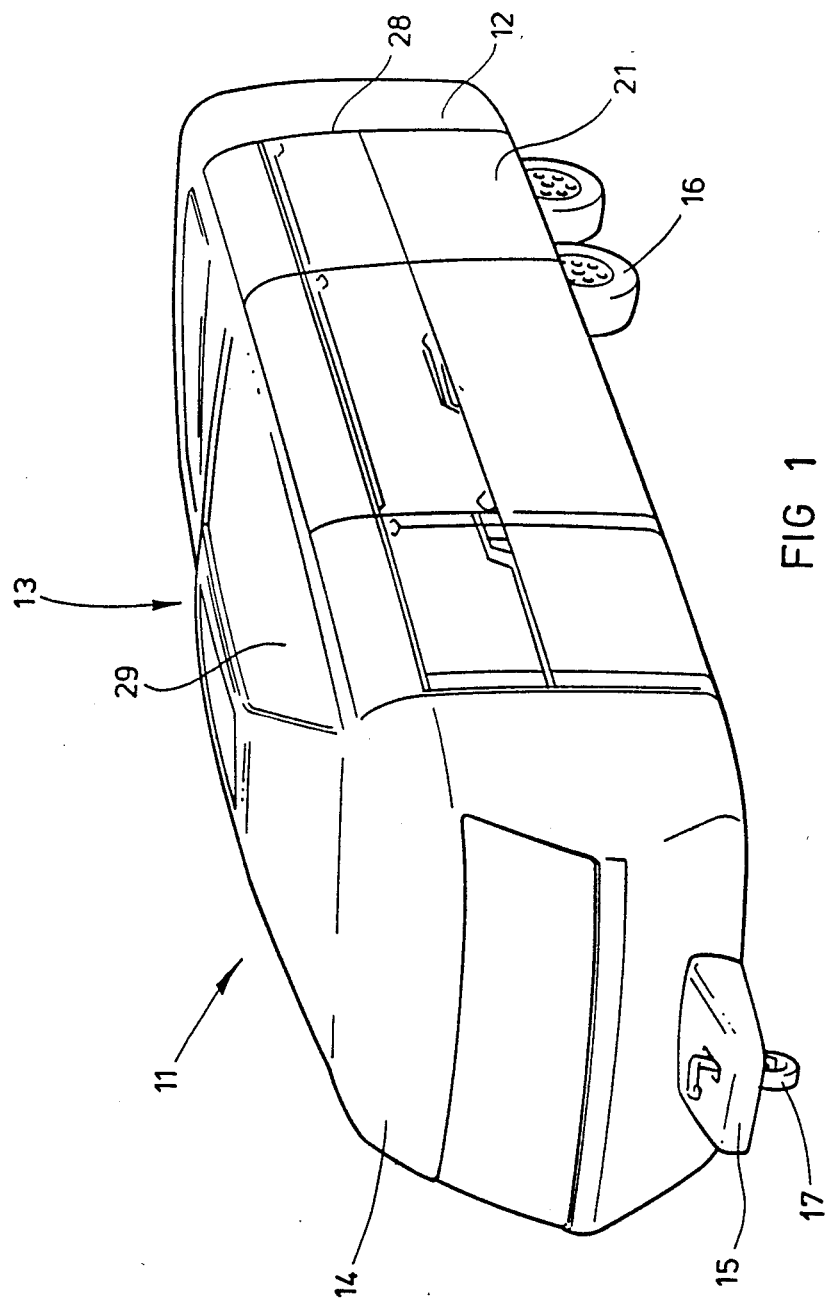
FIG. 1 is a perspective view of a caravan formed as an embodiment of the invention fitted with an extension structure shown in its collapsed state.

Referring now to the drawings, a caravan generally indicated with the reference numeral 11 comprises a mobile accommodation structure with two opposite side walls 12, a roof generally indicated 13, a front wall 14 from which projects a draw bar structure 15, and the whole assembly is supported on road wheels 16 and, in the stationary, unhitched configuration illustrated, a jockey wheel 17. Additional stabilisers for supporting the caravan 11 in its stationary condition may be provided, but such are not illustrated as they are conventional and do not form part of the present invention.

Figure 2:
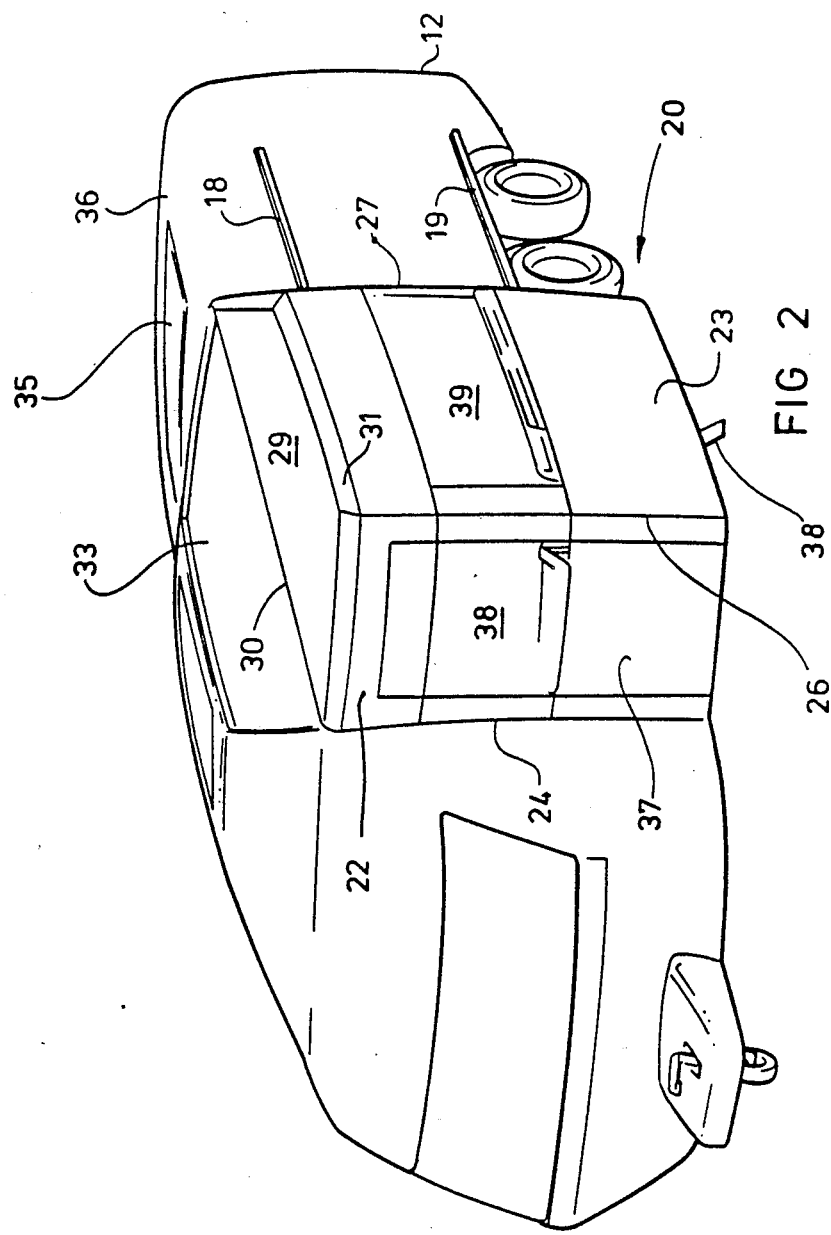
FIG. 2 is a perspective side view of the caravan illustrated in FIG. 1 with the extension structure shown in its erected position.

As can be seen more clearly in FIG. 2, the side wall 12 is provided with two horizontal parallel guide rails 18, 19 on which a first wall 21 of an erectable wall structure of a caravan extension may be pivotally and slidably engaged. The slidable pivot connections between the first wall panel 21 and the slides 18, 19 is not illustrated in detail. A second wall panel 22 of the extension 20 is pivotally connected at a first edge 24 to the said one wall 12 of the caravan 11 and a third wall panel 23 is pivotally connected at opposite side edges 26, 27 to the "free" edges of the first and second wall panels 21, 22 respectively to form a trifoliate hinged structure joined to the caravan 11 only along the hinged edge 24 of the second wall panel 22 and the slidably hinged edge 28 (seen in FIG. 1) of the first wall panel 21.

A roof panel for the extension 20 is formed as a trapezoidal element 29 hinged along edge 30 to the roof 13 of the caravan 11 so that it can turn between an overlying, use position as shown in FIG. 2 where a perimetral lip or flange 31 covers the upper edges of the three extension wall panels 21, 22, 23 and an out-of-use position illustrated in FIG. 1 where it is engaged in a correspondingly shaped trapezoidal recess 33 (see FIG. 2).

The roof 13 of the caravan 11 may be formed, as illustrated in FIGS. 1 and 2, as a shallow truncated rectangular pyramid the upper face of which is formed with a transparent skylight window 34. A further skylight window 35 is provided in a flat roof portion 36 of the roof 13.

As can be seen from the drawings, the second wall panel 22 of the extension structure 20 is provided with a door 37 having a window 38, which door can be used to gain access to the caravan 11 both when the extension structure is in its erected position illustrated in FIG. 2 and in the collapsed position illustrated in FIG. 1. Likewise, the third wall panel member 23 of the extension structure is provided with a window 39 which, again, is unobstructed when the extension structure is collapsed.

Referring now to FIG. 4 it will be seen that a hinged floor member 31 of trapezoidal shape matching that of the roof panel 29 is hinged along a hinge line 32 parallel to the side wall 12 and turnable between a horizontal, erected position generally co-planar with the floor 34 of the caravan, and a collapsed position where it lies generally perpendicular to the floor and parallel to the wall 12.

As can be seen in FIG. 3 the caravan 11 is provided with similar extension structure 20' on the opposite side so that the interior volume can be extended on both sides. Although the additional volume is not a major proportion of the volume of the original accommodation defined by the caravan 11 it is nevertheless crucial in allowing a very different layout from normal, in particular by making it possible for a central table or bed 35 to be position along one side of the caravan 11 but accessible from all sides when the extension is erected.

Conversion of the caravan 11 from its extended to its non-extended condition can be achieved very easily simply by releasing appropriate locks along the edge 28 of the first wall panel member 21 and then turning the second wall panel member 22 whilst simultaneously drawing the third wall panel member 23 outwardly until the pivoted edge 28 of the first wall panel member 21 slides along the rails 18 to engage with appropriate latches or locks provided for this purpose (but not shown in the drawings) the roof panel 29 can then be turned about the hinge line 30 to cover the extension and, upon opening the door 37, it is a simple matter to fold down the floor panel 31, this engaging in suitable latches or abutments provided on the inside faces of the first, second and third wall panel members 21, 22, 23. Likewise, collapsing the extension can be achieved in reverse order by folding the floor and roof panels back to their collapsed position and drawing the edge 28 of the first wall panel member back along the rails 18, 19 which simultaneously causes the second wall panel member 22 to turn about the hinge line 24 and the third wall panel member 23 to be positioned flat against the side wall 12 where it can be retained, again by suitable catches or latches (not shown).

The angle through which the walls 37, 21 turn when moving between the storage or collapsed position and the erected position has been illustrated by way of example only as being in the region of 45°, but this angle may, of course, be different if required. In FIG. 4 has been shown in broken outline the configuration which would be adopted when the structure is erected if the walls 37 and 21 are turned through 90°. Any intermediate angle may also be chosen, and the floor and roof members appropriately sloped.

For added stability one or more additional stabiliser legs 38 are provided, extendable automatically upon erection of the foldable extension 20.

What is claimed is:

1. A mobile accommodation structure having:
   two opposite side walls, a floor and a roof,
   at least one foldable extension erectable from at least one of said two opposite side walls to enlarge the interior volume of said mobile accommodation structure,
   said foldable extension having a wall structure including:
   a first wall panel having a first edge and a second edge,
   means pivotally and slidably connecting said first edge of said first wall panel to said at least one of said two opposite side walls of said mobile accommodation structure,
   a second wall panel having a first edge and a second edge,
   means pivotally interconnecting said first edge of said second wall panel to said at least one of said two opposite side walls of said mobile accommodation structure,
   means pivotally interconnecting said second edge of said second wall panel and said second edge of said first wall panel whereby to allow movement of said foldable extension between an erected position in which said first wall panel lies at an angle to said one of said two opposite walls and a storage position in which said first wall panel lies generally parallel to said one of said two opposite walls and displaced parallel thereto from its erected position,
   a roof panel member movable between an erected position in which it overlies said wall structure and a storage position, and
   a movable floor panel displaceable between an erected position in which it lies parallel to and coplanar with said floor of said mobile accommodation structure within the volume defined by said erected wall structure, and a storage position.

2. The mobile accommodation structure of claim 1, wherein said means pivotally interconnecting said second wall panel of said erectable wall structure to said at least one of said two opposite side walls of said mobile accommodation structure has a fixed pivot axis.

3. The mobile accommodation structure of claim 1, wherein said means pivotally interconnecting said second edge of said second wall panel and said second edge of said first wall panel comprise a third wall panel of said erectable wall structure, said third wall panel being pivotally connected by opposite edges thereof to said second edges of said first and second wall panels.

4. The mobile accommodation structure of claim 3, wherein at least one of said second and third wall panels is provided with at least one of a window and a door.

5. The mobile accommodation structure of claim 1, wherein said first wall panel is provided with windows.

6. The mobile accommodation structure of claim 1, wherein said means pivotally and slidably connecting said first edge of said first wall panel to said at least one of said two opposite side walls of said mobile accommodation structure comprises a constrained pivot slidable along tracks on said at least one of said two opposite side walls of said mobile accommodation structure.

7. The mobile accommodation structure of claim 1, wherein said movable roof panel is hinged to turn about a hinge axis parallel to said one side wall between a use position in which it lies over the walls of said erectable wall structure and a storage position in which it overlies said roof of said mobile accommodation structure.

8. The mobile accommodation structure of claim 1, wherein said movable floor panel is hinged to said mobile accommodation structure for turning movement about a pivot axis parallel to said one side wall between a use position in which it lies coplanar to said floor of said mobile accommodation structure and a storage position generally parallel to said at least one of said two side walls.

9. The mobile accommodation structure of claim 4, wherein said door in said second wall panel is usable in both the erected and collapsed positions of said foldable extension.

10. The mobile accommodation structure of claim 1, wherein said means pivotally interconnecting said first edge of said second wall panel to said at least one of said two opposite side walls of said mobile accommodation structure is a slidable pivot means displaceable along said at least one of said two opposite side walls of said mobile accommodation structure.

11. The mobile accommodation structure of claim 1, wherein there are provided power driven means for turning the respective said wall panels about their pivotal connections whereby to drive said foldable extension unit between its use and its storage positions.

12. The mobile accommodation structure of claim 1, wherein there are provided interior furnishing units attached to at least one of the said erectable wall panels for movement therewith.

13. The mobile accommodation structure of claim 1, wherein both of said two opposite side walls of said mobile accommodation structure are provided with foldable extension units.

14. The mobile accommodation structure of claim 1, wherein said mobile accommodation structure is provided with stabilising legs which are erected contemporaneously with the erection of said foldable extension unit to its use position.

* * * * *